July 10, 1956  P. DAVID  2,753,916
APPARATUS FOR BENDING PIPE BARS AND OTHER ELEMENTS
Filed Jan. 14, 1955  4 Sheets-Sheet 1
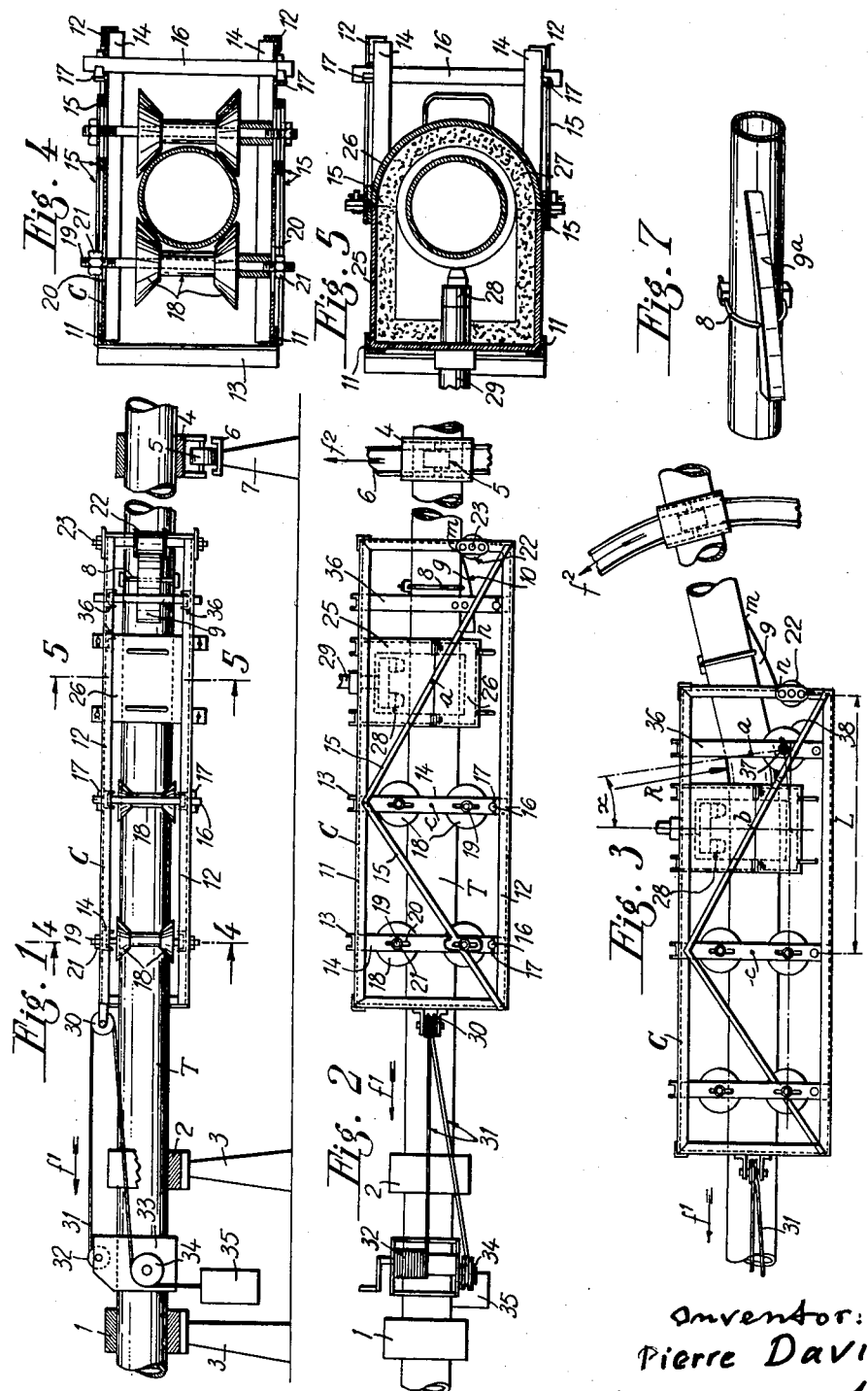
Inventor:
Pierre David
by: J. Delletre-Seguy
Attorney July 10, 1956 P. DAVID 2,753,916
APPARATUS FOR BENDING PIPE BARS AND OTHER ELEMENTS
Filed Jan. 14, 1955 4 Sheets-Sheet 2

Inventor:
Pierre David
by: J. Delatte Seguy
Attorney

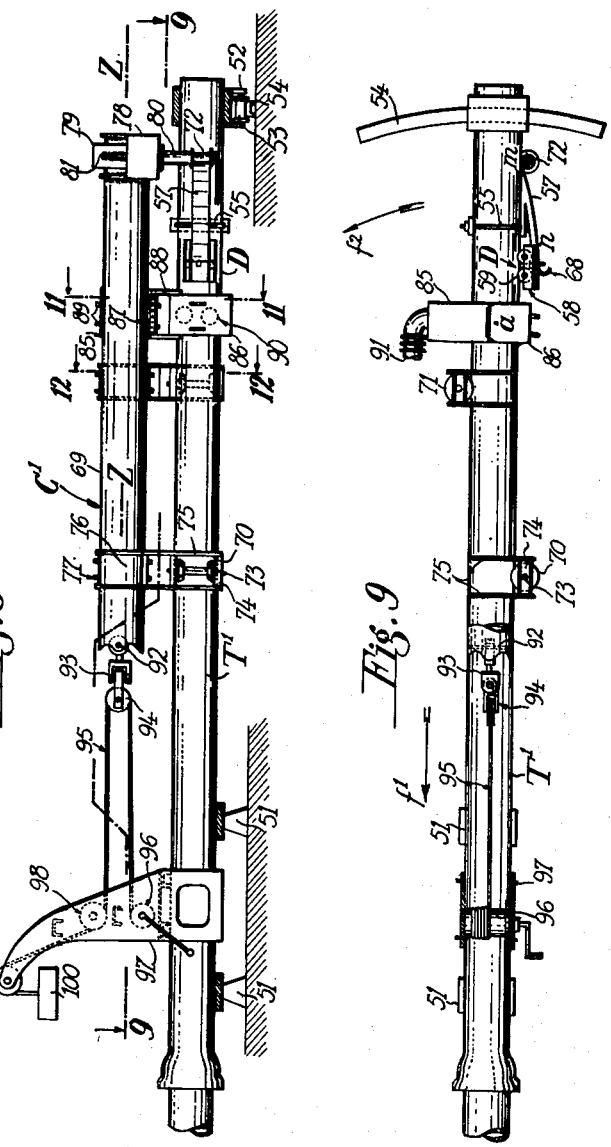
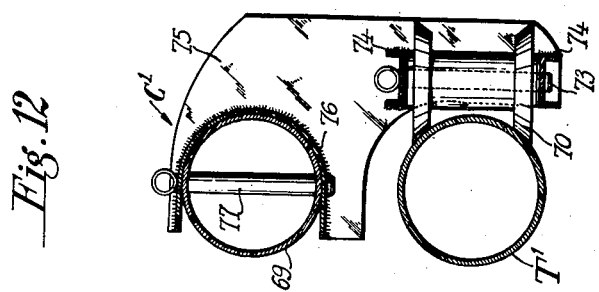

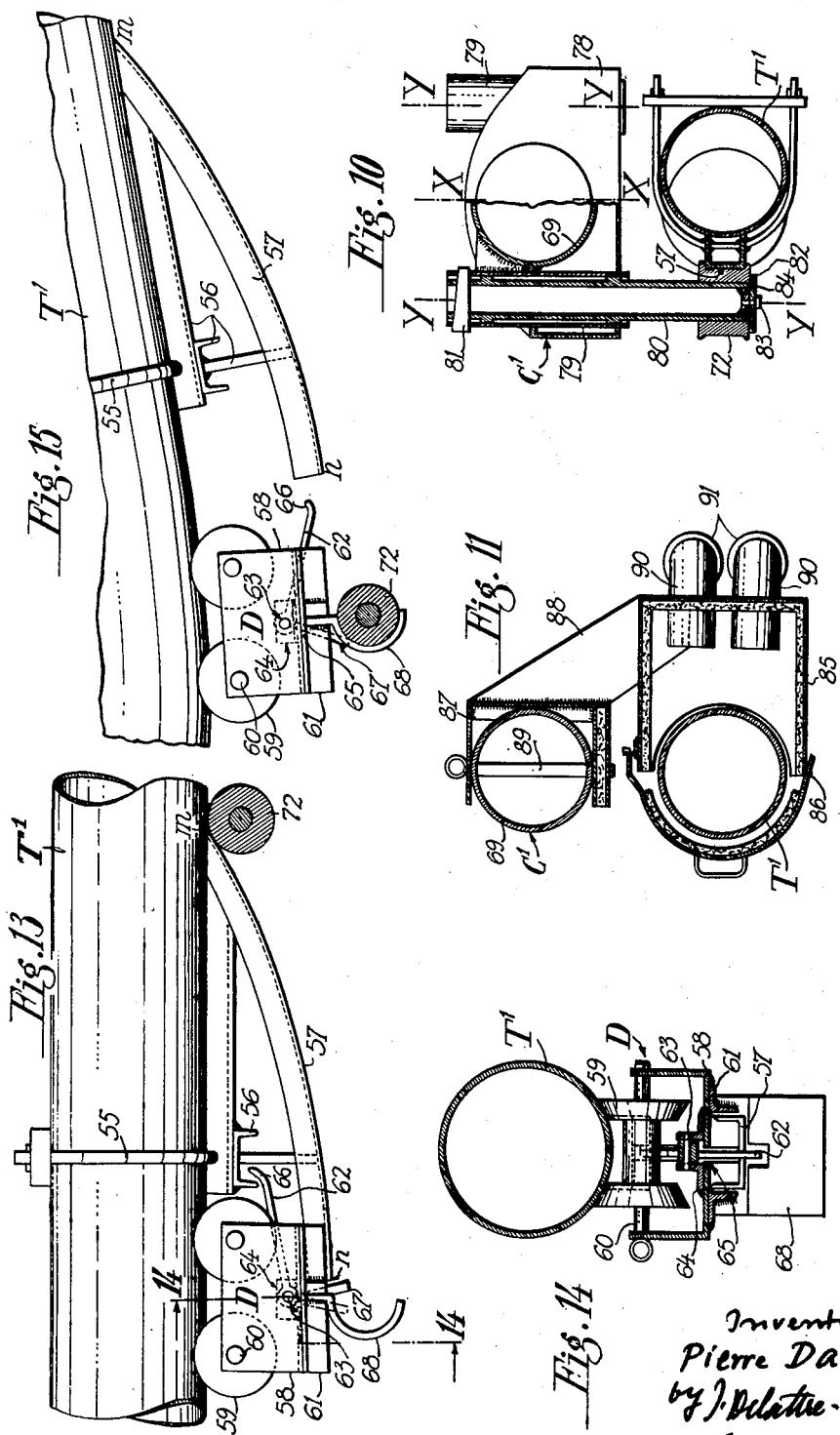

United States Patent Office 2,753,916
Patented July 10, 1956

2,753,916

APPARATUS FOR BENDING PIPE BARS AND OTHER ELEMENTS

Pierre David, Pont-a-Mousson, France, assignor to Compagnie de Pont-a-Mousson, Nancy (Meurthe-et-Moselle), France, a French body corporate Application January 14, 1955, Serial No. 481,847

Claims priority, application France January 15, 1954

20 Claims. (Cl. 153—48)

The present invention relates to bending pipes, bars, section steels and other long elements of metal or other material and in particular cast iron pipes.

A process of bending cast iron pipes is known which consists in automatically effecting a displacement between the pipe to bend and one or several burners in a single radial axial plane of the bend to be obtained in such manner that this displacement is a function of the bending angle already obtained and of the radius or radii of curvature desired for the bend formed.

Modes of applying this process are also known in which the bending is effected in a vertical plane according to a small radius of curvature which is obtained by means of pulleys, connecting rods or articulated arms; furthermore, the pipe to bend is subjected to a bending force by means of a weight applied either directly to the end of the pipe or to an articulated device connected with said end, the bending of the pipe automatically causing the displacement of the burner or burners.

Obtaining the radius of curvature by means of pulleys, connecting rods or articulated arms, etc. restricts the range of radii of curvature it is possible to obtain with a given equipment.

The invention has for object to provide an improved apparatus for bending elements such as pipes, bars, section steels, sheets and other elements of metal or other material and which permits obtaining a whole range of large radii of curvature of a metre and more.

A further object of the invention is to provide a bending apparatus which comprises in combination, a device for maintaining in a fixed orientation one of the ends of the element to bend, a cam provided with a device for fixing it in a removable manner on the element to be bent, this cam which forms a guide ramp having the form of a wedge the outer profile of which corresponds to that of the bend to be obtained, a chassis movable along the element to be bent, a driving device for moving this chassis, at least one burner mounted on said chassis and a counter-cam rigid with said chassis and adapted to co-operate with said cam during the movement of said chassis so as to constrain the heated portion of said element to bend.

Further features and advantages of the invention will be apparent from the ensuing description.

In the accompanying drawings given merely by way of example:

Fig. 1 is an elevational view of a bending apparatus embodying the invention, this apparatus being in condition for immediate use;

Fig. 2 is a corresponding plan view;

Fig. 3 is a similar view of the apparatus, the latter being in the position it occupies in the course of operating;

Figure 6:
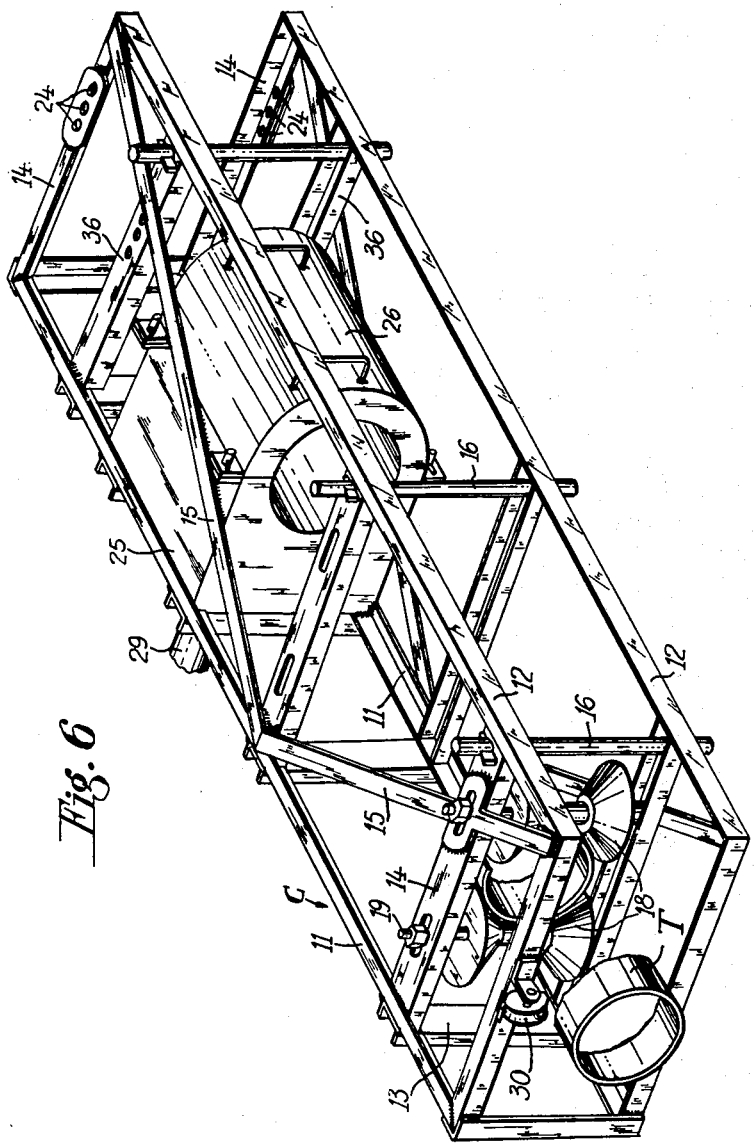

Figs. 4 and 5 are cross-sectional views along lines 4—4 and 5—5 of Fig. 1 on a larger scale;

Fig. 6 is a perspective view of the chassis on a larger scale;

Fig. 7 is a perspective view of a bending cam for twisted bends in the form of a helix;

Fig. 8 is an elevational view of another embodiment of the bending apparatus in position for immediate use;

Fig. 9 is a horizontal sectional view along line 9—9 of Fig. 8;

Fig. 10 is an end view with a part cut away of the bending head of the apparatus in the position it occupies in the course of operation;

Figs. 11 and 12 are vertical sectional views along lines 11—11 and 12—12 of Fig. 8 on a larger scale.

Fig. 13 is a plan view of the cam and of the counter-cam before the bending operation;

Fig. 14 is a vertical sectional view along line 14—14 of Fig. 13 on a larger scale and Fig. 15 is a plan view similar to that shown in Fig. 13, a part of the cam having been separated from the other cam in the course of operation.

According to the embodiment shown in Figs. 1 to 6, the invention is applied to the bending of a pipe T in a horizontal plane. This pipe is held in position adjacent one of its ends between the jaws 1 and 2 fixed to supports 3. The other end of the pipe is carried by a carriage 4 which is capable of moving owing to the provision of a roller 5 which rests on a fixed runway 6. The latter is preferably incurved and is constituted by a section steel carried by a support 7.

Fixed on the pipe T by means of a strap 8 is a cam or guide ramp 9 in the form of a wedge; the profile of this cam 10 extends from m to n and corresponds to the shape of the bend to be obtained. This cam is placed on the generatrix of the pipe which is situated in the horizontal axial plane of the pipe and is disposed on the side of the latter opposed to the direction of bending so that its end n (where its thickness is greatest) is situated about 10 cm. from the start of the portion to be bent, this start being situated in line with the point a of the axis of the pipe.

Fixed on the pipe is a light, rigid chassis C which has the general shape of a U, it being open on the right side as seen in Figs. 4 and 5. This chassis C comprises section steels and includes four longitudinal bars, two of which are rear bars 11 and two front bars 12. These bars are rigidly connected together by rear uprights 13, cross members 14 and strengthening stays 15. Further, after having placed the chassis on the pipe T to be bent, the two longitudinal front bars 12 are connected together by means of spacer elements 16 held fast by means of keys 17. In Fig. 1, for reasons of clarity the left spacer element 16 and its keys 17 are not shown.

This chassis C is capable of moving along the pipe owing to the provision of guide rollers 18 having conical cheeks so that their grooves have the cross-sectional shape of a V. These rollers, for example four, roll on either side of the pipe and are disposed in the part of the chassis C nearest the end of the pipe fixed to the jaws 1 and 2. They are removable so as to permit the chassis to be put into position and the distance between them is adjustable for the purpose of adapting them to pipes having different outer diameters. Their spindles 19 on which the rollers are rotatably mounted are parallel but are prevented from moving vertically, for example they are engaged in openings 20 formed in the cross members 14 and held in position by nuts 21.

The other end of the chassic C includes, mounted thereon, a roller 22 which forms a counter-cam adapted to co-operate with the cam 9. This roller 22 is carried by a vertical journal 23 which is adjustable in apertures 24 (Fig. 6) carried by the upper and lower cross-members 14 at the end of the chassis. Furthermore, fixed on the chassis C between the rollers 18 and the roller 22, is a casing 25 which has two parts and encompasses the pipe T. This casing is provided interiorly (Fig. 5) with a refractory material 27, for example asbestos. Disposed in this sleeve are several burners 28, for example two, which are connected by a pipe 29 to a source of combustible fluid, for example gas. These burners are oriented in the horizontal plane and directed towards the inner generatrix of the bend to be obtained.

The chassis C carries at the end thereof at which the rollers 18 are disposed a pulley 30 around which passes a cable 31. One end of the latter is passed round a winch 32 the support of which is secured to the pipe T. Adjacent its other end, this cable passes around a return pulley 34, the latter being mounted on the support 33 of the winch. A weight 35 is suspended from this end of the cable.

The chassis C comprises furthermore two cross members 36 (Figs. 1 to 3 and 6) which are adapted to receive the spindle 37 of a removable roller 38 (Fig. 3) which is adapted to roll on the pipe T. The purpose of this roller will be explained hereinafter.

The apparatus operates in the following manner:

After having fixed the pipe T between the jaws 1 and 2, the other end of this pipe resting on the carriage 4, the cam 9 is secured to the pipe by means of the strap 8 in such manner that the end $n$ of this cam is situated about 10 cm. from the start (point $a$) of the portion of the pipe to be bent (Figs. 1 and 2). The chassis C is placed in position on the pipe, the rollers 18 and the spacer members 16 also being placed in position. The positions of the roller 22 and of the casing 25, 26 are so adjusted that when the roller 22 is situated at the start $m$ of the cam 9 (Figs. 1 and 2), the burners 28 are facing the point $a$ in line with which the bend must start.

The weight 35 suspended from the end of the cable 31 is raised by means of the winch 32 and this subjects the chassis C to a traction in the direction of arrow $f^1$. Despite the tractive force exerted, this chassis remains stationary, since the cam 9 carried by the pipe T (which is therefore fixed in the longitudinal direction) prevents displacement of the chassis, the roller 22 bearing against this cam at $m$. The burners 28 are then lit. The portion of the pipe T exposed to these burners in the region of the point $a$ is brought to a temperature which depends on the material of the pipe and which is for example of the order of 800°–900° C. in the case of a cast iron pipe. This temperature renders the latter deformable. Under the effect of the force of traction due to the weight 35, the roller 22 runs along the ramp $mn$ and forces the pipe to bend in the direction of arrow $f^2$ (Fig. 2) whereupon the chassis C moves in the direction of arrow $f^1$. The free end of the pipe moves along the runway 6.

When the roller 22 arrives at point $n$ on the cam 9 the bending operation is complete. If a greater bending angle is required, the weight 35 is moved down to the ground, the burners 28 are, if need be, turned off and the cam 9 and roller 22 are dismantled. The roller 38 is then mounted (Fig. 3) and its position is so arranged that this roller is in contact with the pipe in line with the point $a$ which corresponds to the start of the bend.

The weight 35 is then raised off the ground and the burners 28 lit. The bending operation is performed, the roller 38 rolling along the part already bent, which corresponds to the portion $ab$ along the axis of the pipe, until the desired pipe length has been bent.

It is clear that in this last bending stage the portion of the pipe already bent serves as a bending cam.

It will be noted that an abutment may be fixed on the pipe at the required position which actuates a switch placed on the chassis and thereby gives a signal denoting the end of the bending operation.

From the foregoing it can be seen that the burners are moved along the pipe a distance which is substantially equal to the product R$x$, R being the radius of curvature and $x$ the bending angle already obtained in the first bending stage. Further, the bending movement, which is equal to the constant load applied by the roller 22 (or the roller 38) on the pipe multiplied by the constant distance L comprised between said roller 22 (or 38) and the cross-sectional plane containing the point $c$ of the axis of the pipe and the axes of the two first rollers 18, is constant. The bend of the pipe is effected firstly in accordance with the shape of the surface 10 of the cam 9 which guides the bending, and then in accordance with the shape of the portion of the pipe already bent in accordance with the cam. The bending is therefore regular. In the course of the bending operation, the convex portion of the bend (external fibres) is not in contact with the flames of the burners and is brought to a temperature less than the concave portion. Thus the deformation of the pipe results in effect in an increase in the thickness of the concave portion which is made deformable, the convex portion retaining its initial thickness.

The bending operation just described relates to a bend in the form of a segment of a circle.

If it is desired to obtain a bend having the form of a spiral or a twisted bend in the form of a helix, the device of the invention permits application of known methods. It suffices to utilize an appropriate cam for example the cam $9^a$ shown in Fig. 7 in the case of twisted bends.

S-shaped pipes may be obtained by means of this device by reversing the positions of the ends of the pipe (the fixed end becomes the free end) after having effected a first bend, or by turning the chassis C through 180°, the cam 9 being placed on the concave generatrix of the portion already bent.

The device is particularly useful for exterior work in the field owing to the lightness of the chassis C and to the simplicity and rapidity of mounting due to the fact that the spindles and the spacer members and the clamping of the straps may be locked in position with the aid of conical keys or pegs inserted by hammering, the normal screw and nut devices having been eliminated.

This simplicity in mounting together with the method of bending in a horizontal plane, enables the device to be used if required for effecting bends on a pipe already laid.

The following advantages are noteworthy:

$a$. Speed of bending owing to the fact that the burners 28 only remain in front of a portion of a pipe during a period of time strictly necessary for application of the required heat for bending this portion and immediately after are moved away; furthermore, the portion heated is surrounded by the heat-insulated sheath.

$b$. Economy of combustible owning to the heat insulation.

$c$. Economy of labour owing to the automatic nature of the operation.

According to the modification shown in Figs. 8 to 15, the invention is shown applied to a bending operation on a pipe $T^1$ (Figs. 8 and 9) in a horizontal plane. As in the first example, the pipe to be bent is supported adjacent one end by supports 51 whereas its other end is carried by a carriage 52 which is capable of moving owing to the provision of a roller 53 which rolls along a fixed runway 54 which is preferably incurved and comprises a section steel.

Fixed on the pipe $T^1$ by means of a strap 55, is the support 56 of a cam or guide ram 57 in the form of a wedge and whose outer profile $mn$ corresponds to the shape of the bend to be obtained (Figs. 9, 13 and 15). This cam is prolonged by an auxiliary device D supported by said cam 57 and support 56 and said device D is removable and constitutes a carriage. This device comprises a chassis 58 in the form of a U and which is capable of moving along the pipe $T^1$ owing to the provision of two rollers 59 having conical cheeks and journalled on spindles 60.

Welded to this chassis 58, are angle irons 61 which are spaced apart such distance that the end of the cam 57 is capable of penetrating therebetween. The outer edges of the angle irons 61 are on the same level as the outer face of this cam.

A cranked lever 62 is pivoted on a spindle 63 carried by two angle irons 64 which are welded to the chassis 58. This lever lies in the axial plane of the carriage and it freely passes through an opening 65 formed in the carriage (Fig. 14). One of the ends 66 of the lever 52 forms a hook which is capable of engaging the support 56 of the cam 57 (Fig. 13). The other end 67 of the lever forms a heel which protrudes beyond the operative face of the cam 57. A semi-cylindrical plate 68 forming a cradle is fixed to the chassis 58 in line with the opening 65, for example by welding, and the heel 67 is positioned in front of this cradle on the same side thereof as the cam 57.

Mounted on the pipe $T^1$ (Figs. 8 and 9) is a light rigid chassis $C^1$ comprising a metal beam 69 which is for example cylindrical. This beam is capable of moving along the pipe $T^1$ owing to the provision of two guide rollers 70 and 71 (Fig. 9) which have conical cheeks and a third roller 72 which forms, moreover, a counter-cam for the bending operation. These rollers are spaced apart a certain distance and are mounted on either side of the pipe, so that the middle roller 71 is disposed on the opposite side of the pipe to the rollers 70 and 72.

The rollers 70 and 71 are removable and are capable of rotating on pins 73 (Figs. 8, 9 and 12) carried by two U-section members 74 which serve as spacer members for the sides 75 to which they are welded. These sides are notched at their upper part and are welded to a U-shaped member 76 which is capable of partially surrounding the beam 69. The support of the rollers is fixed to said beam with the aid of pins 77 which are removable and extend through the beam 69 and the member 76.

Fixed at one end of the beam 69, for example by welding, is a bending head 78 (Figs. 8 and 10). This head comprises two tubes 79 which are symmetrically disposed relative to the axis XX of the head. The axes YY of these sleeves or tubes 79 are parallel with one another and with the axis XX and perpendicular to a horizontal plane containing the longitudinal axis ZZ of the beam 69 (Fig. 8).

In either one of these tubes, depending on the direction of bending, is introduced a tubular shaft 80 which is held in position by means of a conical key or peg 81 which extends through the upper end of the shaft 80 and the tube 79. On the lower part of the shaft 80 is journalled the guiding and bending roller 72 forming the counter-cam which co-operates with the cam 57. This roller 72 is retained by a disc 82 which rests against the lower face of the roller and is fixed by means of a screw 83 screwed in a plug 84 welded to the shaft 80.

It will be noticed that in order to permit the beam 69 to move along the pipe, the roller 70 and the roller 72 must be disposed on the same side thereof outside the bend to be obtained, the roller 71 being disposed on the inside of the bend.

Disposed between the rollers 71 and 72 is a casing which is composed of two sections 85 and 86 and encompasses the pipe $T^1$ (Figs. 8, 9 and 11). This casing is fixed to the beam 69 in a removable manner similar to the method of fixing the supports of the rollers 70 and 71. A U-section member 87 (Fig. 11) rigid with the part 85 of the casing, through the medium of plates 88, is attached to the beam 69 by pins 89. In this casing 85—86 are disposed burners 90, for example two, which are connected by pipes 91 to a source of combustible fluid, for example gas. These burners are directed towards the inner generatrix of the bend to be obtained.

At the other end of the beam 69 (Figs. 8 and 9) is hooked at 92 a double universal joint 93 serving as a support for a pulley 94 around which passes a cable 95. One end of the latter is wound round a winch 96 the support 97 of which is fixed to and positioned above the pipe $T^1$. Adjacent its other end, this cable passes round a pulley 98 mounted in the middle of the support 97 of the winch 96 above the pipe $T^1$. The cable also passes around a second pulley 99 situated at a higher level and from this end of the cable there is suspended a weight 100.

The apparatus operates in the following manner:

With the pipe $T^1$ resting on the supports 51 and its free end resting on the carriage 52, the cam 57 is secured to the pipe $T^1$ with the aid of the strap 55 in such manner that the end $n$ of this cam is situated about 10 cm. from the start (point $a$, Fig. 9) of the portion of the pipe to be bent. The winch 96 is also secured to the pipe.

The beam 69 is placed in position above the pipe and the casing 85—86 containing the burners 90 is positioned in such manner that these burners are facing said point $a$ in line with which the bending operation must start when the roller 72 is situated at position $m$ at the start of the cam 57.

The weight 100 suspended from the end of the cable 95 is then raised by means of the winch 96 and this subjects the beam 69 to a traction toward the left as seen in Fig. 8. Despite this traction, this beam remains stationary since the cam 57 (secured to the pipe $T^1$) prevents its displacement, the roller 72 butting at $m$ against this cam.

The burners 90 are then lit. The portion of the pipe $T^1$ exposed to the burners in line with the point $a$ is brought to a temperature which renders it deformable. Under the effect of the force of traction due to the weight 100, the roller 72 rides up the ram $mn$ and forces the pipe to bend in the direction of arrow $f^2$ (Fig. 9) and the beam 69 then moves in the direction of arrow $f^1$.

When the bending roller 72 reaches and engages the auxiliary removable portion D of the cam (Fig. 13) and urges back the heel 67 of the lever 62, the latter pivots about its pivot 63 and its end 66 is unhooked from the support 56 of the cam 57 and the unit D is thus released from the cam 57. The bending roller 72 is then disposed in the semi-cylindrical cradle 68 (Fig. 15) and drives the device D which, in rolling along a portion of the pipe which has already been bent, permits the operation to be continued.

Thus, owing to this carriage D the bending operation may be effected without interruption and without having to change the position of the bending roller 72 when the latter leaves the cam 57, which was necessary in the first example.

Further, the simplified form of the bending chassis in the form of the beam 69, and the particular disposition of the rollers 70 and 71 permits placing the chassis in position on the pipe from above the latter, no member extending under the pipe. Thus the bending operation may be effected nearly at ground level. The simplified assembly and disassembly of the chassis permits the operation to be carried out on two pipes already assembled in a pipe line. This eliminates a considerable part of the work involved in fixing one of the ends of the pipe.

Although specific embodiments of the invention have been described and illustrated, many modifications may be made therein without departing from the spirit of the invention or the scope of the appended claims.

Thus the method of heating may vary according to the available energy, for example it may be electric or thermic (solid, liquid or gaseous combustibles). Any number of burners may be provided, these burners being of any type.

The bending operation may be facilitated by the usual methods and in particular by means of auxiliary weights which exert a traction on the free end of the pipe in accordance with the orientation and direction of displacement of this end. Furthermore, the above-described device may also be utilized for a bending operation in a vertical or oblique plane, which may be rendered necessary by the position of the pipe line. In the case of a bending operation in a vertical plane, the cam would be disposed on the upper generatrix of the pipe and the carriage 4 or 53 and the support 7 or 54 may be eliminated, since the free end of the pipe would move in a vertical plane under the effect of its own weight.

If need be, the means for maintaining one of the ends of the element to be bent may comprise another element already connected to this element to be bent. Thus in the case of a pipe line, the adjoining pipe of the pipe line may perform this function.

Having now described what I claim as new and desire to secure by Letters Patent is:

1. In combination with an elongated element which is to be bent so as to form a bend having a radius of curvature of the order of at least one metre: means for maintaining said element at one of its ends in a fixed orientation, a cam forming a guide ramp whose outer profile corresponds to the shape of the bend to be obtained, a device for fixing this cam in a removable manner on said element to be bent on the side thereof opposite to that towards which said element is to be bent, a support chassis movable along said element forming a guide; a driving device for moving said support chassis along said element, at least one burner carried by said chassis for heating the portion of the element which is to be bent and a counter-cam fixed on said chassis and adapted to be moved into contact with said cam in the course of the movement of the chassis on the element to be bent so as to constrain said heated portion to bend.

2. Apparatus for imparting to an elongated element such as a pipe, or a cylindrical bar, a bend having a large radius of curvature of the order of at least one metre, said apparatus comprising in combination: means for maintaining said element at one of its ends in a fixed orientation, said element being itself fixed to said means and which during its bending also constitutes a guide and a support, a cam forming a guide ramp whose outer profile corresponds to the shape of the bend to be obtained, a device for fixing said cam in a removable manner on said element on the side thereof opposite to that towards which said element is to be bent, a support chassis movable along said element and forming a guide; a driving device for moving said support chassis along said element, at least one burner carried by said chassis for heating the portion of said element which is to be bent, and a counter-cam fixed on said chassis and adapted to be moved into contact with said cam in the course of the movement of the chassis along the element to be bent so as to constrain said heated portion to bend.

3. Apparatus as claimed in claim 2, wherein said burner is so disposed on said chassis as to heat said element on the side thereof which is on the inside of the bend obtained.

4. Apparatus as claimed in claim 2, wherein said means for maintaining the element to be bent in a fixed orientation comprises at least one clamp.

5. Apparatus as claimed in claim 2, wherein the device for fixing the cam on the element to be bent comprises at least one strap.

6. In combination with an elongated element which is to be bent so as to form a bend having a radius of curvature of the order of at least one metre: means for maintaining said element at one of its ends in a fixed orientation; a cam forming a guide ramp whose outer profile corresponds to the shape of the bend to be obtained; a device for fixing this cam in a removable manner on said element to be bent on the side thereof opposite to that towards which said element is to be bent; a support chassis movable along said element forming a guide; a driving device for moving said support chassis along said element, this driving device comprising a support fixed on said element, a winch journalled in this support, a first pulley carried by said support chassis, a second pulley carried by said support, a cable passed around said winch and around said first and said second pulley in succession and a counterweight suspended from this cable after said second pulley; at least one burner carried by said chassis for heating the portion of the element which is to be bent and a counter-cam fixed on said chassis and adapted to be moved into contact with said cam in the course of the movement of the chassis on the element so as to constrain said heated portion to bend.

7. In combination with an elongated element which is to be bent so as to form a bend having a radius of curvature of the order of at least one metre: means for maintaining said element at one of its ends in a fixed orientation, a cam forming a guide ramp whose outer profile corresponds to the shape of the bend to be obtained, a device for fixing this cam in a removable manner on said element to be bent on the side thereof opposite to that towards which said element is to be bent, a support chassis movable along said element forming a guide; a driving device for moving said support chassis along said element; at least one burner carried by said chassis for heating the portion of the element which is to be bent; a journal carried by said support chassis and a roller rotatably mounted on said journal and forming a counter-cam adapted to be moved into contact with said cam in the course of the movement of the chassis on the element to be bent so as to constrain said heated portion to bend.

8. In combination with an elongated element which is to be bent so as to form a bend having a radius of curvature of the order of at least one metre: means for maintaining said element at one of its ends in a fixed orientation, a cam forming a guide ramp whose outer profile corresponds to the shape of the bend to be obtained, a device for fixing this cam in a removable manner on said element to be bent on the side thereof opposite to that towards which said element is to be bent, a support chassis movable along said element forming a guide, a driving device for moving said support chassis along said element, at least one burner carried by said chassis for heating the portion of the element which is to be bent, a first journal carried by said support chassis, a roller rotatably mounted on said journal and forming a counter-cam adapted to be moved into contact with said cam in the course of the movement of the chassis on said element so as to constrain said heated portion to bend, a second journal parallel with said first journal and a removable auxiliary roller freely rotative on said second journal in a position situated between said burner and said roller forming the counter-cam for rolling on the portion of the element which is already partially bent so as to continue the bend.

9. In combination with an elongated element which is to be bent so as to form a bend having a radius of curvature of the order of at least one metre: means for maintaining said element at one of its ends in a fixed orientation, a cam forming a guide ramp whose outer profile corresponds to the shape of the bend to be obtained, a device for fixing this cam in a removable manner on said element to be bent on the side thereof opposite to that towards which said element is to be bent, a support chassis movable along said element forming a guide, a driving device for moving said support chassis along said element, a heat insulated casing carried by said support chassis and surrounding said element along which it is capable of moving with said support chassis, at least one burner housed in said casing to which it is fixed for heating the portion of said element which is to be bent and a counter-cam fixed on said chassis and adapted to be moved into contact with said cam in the course of the movement of the chassis on said element so as to constrain said portion of said element to bend.

10. In combination with an elongated element which is to be bent in a horizontal plane so as to form a bend having a radius of curvature of at least one metre: means for maintaining said element at one of its ends in a fixed orientation, a horizontal runway disposed below the other end of said element which is free, a carriage capable of rolling along said runway for supporting said other end of the element, a cam forming a guide ramp and whose outer profile corresponds to the shape of the bend to be obtained, a device for fixing said cam in a removable manner on said element to be bent on the opposite side thereof to that towards which said element is to be bent, a support chassis movable along said element forming a guide, a driving device for moving said support chassis along said element, at least one burner carried by said chassis for heating the portion of said element which is to be bent and a counter-cam fixed on said chassis and adapted to be moved into contact with said cam in the course of the movement of the chassis on the element for constraining the heated portion of the element to bend.

11. In combination with an elongated element which is to be bent in a horizontal plane so as to form a bend having a radius of curvature of at least one metre: means for maintaining said element at one of its ends in a fixed orientation, a cam forming a guide ramp whose exterior profile corresponds to the shape of the bend to be obtained, a device for fixing said cam in a removable manner to said element on the side thereof opposite to that towards which said element is to be bent, a support chassis movable along said element forming a guide, a driving device for moving said support chassis along said element, at least one burner carried by said chassis for heating the portion of said element which is to be bent, a counter-cam fixed on said chassis and adapted to be moved into contact with said cam in the course of the movement of the chassis on said element so as to constrain said heated portion of said element to bend, and an auxiliary device which is fixed in a removable manner to said cam, is capable of moving along said element when it is no longer connected to said cam and is adapted to co-operate with said counter-cam for the purpose of continuing the bending of said element after said counter-cam has left said cam.

12. In the combination according to claim 11, the fact that this auxiliary device comprises a carriage adapted to move along said element and is provided with a bearing surface adapted to receive said counter-cam when the latter leaves said cam, there being pivoted to said carriage a hook for hooking the device fixing said cam on said element, said hook being adapted to be automatically retracted by the counter-cam when the latter reaches said bearing surface.

13. Combination as claimed in claim 12, wherein said bearing surface has the shape of a semi-cylindrical cradle and the counter-cam comprises a roller having a diameter which is double the radius of curvature of said cradle.

14. Combination as claimed in claim 13, wherein said hook is provided with a heel which protrudes with respect to said cradle so as to be encountered by said roller forming the counter-cam before the latter reaches said cradle so as to cause initially the retraction of said hook.

15. In combination with an elongated element which is to be bent in a horizontal plane so as to form a bend having a radius of curvature of at least one metre: means for maintaining said element at one of its ends in a fixed orientation, a cam forming a guide ramp whose exterior profile corresponds to the shape of the bend to be obtained, a device for fixing said cam in a removable manner to said element on the side thereof opposite to that towards which said element is to be bent, a beam disposed above said element and forming a support, lateral guide rollers, means for supporting said beam on said rollers, a driving device for moving said beam along said element, at least one burner carried by said beam for heating the portion of said element which is to be bent and a counter-cam carried by said beam and adapted to be moved into contact with said cam in the course of the movement of said beam on the element so as to constrain said heated portion to bend.

16. Apparatus for imparting to an elongated element such as a pipe, or a cylindrical bar, a bend having a large radius of curvature of the order of at least one metre, said apparatus comprising in combination: means for maintaining said element at one of its ends in a fixed orientation, said element being itself fixed to said means and which during its bending also constitutes a guide and a support, a cam forming a guide ramp whose outer profile corresponds to the shape of the bend to be obtained, a device for fixing said cam in a removable manner on said element on the side thereof opposite to that towards which said element is to be bent, a beam disposed above said element and forming a support, lateral guide rollers adapted to roll along said element, means for supporting said beam on said rollers, a driving device for moving said beam along said element, at least one burner carried by said beam for heating the portion of said element which is to be bent and a counter-cam carried by said beam and adapted to be moved into contact with said cam in the course of the movement of said beams on the element so as to constrain said heated portion thereof to bend.

17. Apparatus as claimed in claim 16, wherein said means for supporting said beam on said rollers comprises for each roller: a connecting member having an open cross-section and surrounding said beam, pins for fixing this connecting member on said beam, two parallel side members rigidly fixed to said connecting member, two spacer members connecting said side members and a journal carried by said spacer members and on which said roller is freely rotative.

18. Apparatus as claimed in claim 16, further comprising a heat-insulated casing which surrounds the element to be bent and along which it is movable with said beam, said burner being disposed inside said casing, and a device for fixing the latter to said support beam.

19. Apparatus as claimed in claim 18, wherein said device for fixing the heat-insulated casing to the beam comprises a connecting member having an open cross-section and surrounding said beam, pins for fixing said connecting member on said beam and two side members connecting said connecting member and said heat-insulated casing.

20. Apparatus as claimed in claim 16, further comprising a member fixed to said beam, two parallel tubes fixed to said member on either side of said beam, a removable journal adapted to be engaged in one or other of said tubes according to the direction of the bend to be obtained, and a roller rotably mounted on said journal and constituting said counter-cam.

References Cited in the file of this patent

UNITED STATES PATENTS

| | | |
|---|---|---|
| 643,760 | Brinkman | Feb. 20, 1900 |
| 784,101 | Brinkman | Mar. 7, 1905 |
| 976,599 | Reynolds | Nov. 22, 1910 |
| 1,359,525 | Pratt | Nov. 23, 1920 |
| 1,515,894 | Taylor | Nov. 18, 1924 |
| 1,565,001 | Bayer | Dec. 8, 1925 |
| 2,286,893 | Boissou | June 16, 1942 |
| 2,348,193 | Coombs | May 9, 1944 |
| 2,433,055 | Linden | Dec. 23, 1947 |
| 2,615,490 | Marcy | Oct. 28, 1952 |

FOREIGN PATENTS

| | | |
|---|---|---|
| 15,991 | Great Britain | Oct. 8, 1890 |
| 455,607 | Germany | Feb. 4, 1928 |
| 457,054 | Great Britain | Nov. 20, 1936 |